United States Patent
Hoskote et al.

(10) Patent No.: US 7,668,165 B2
(45) Date of Patent: Feb. 23, 2010

(54) HARDWARE-BASED MULTI-THREADING FOR PACKET PROCESSING

(75) Inventors: Yatin Hoskote, Portland, OR (US); Sriram R. Vangal, Portland, OR (US); Vasantha K. Erraguntla, Beaverton, OR (US); Nitin Y. Borkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1060 days.

(21) Appl. No.: 10/814,496

(22) Filed: Mar. 31, 2004

(65) Prior Publication Data

US 2005/0226238 A1    Oct. 13, 2005

(51) Int. Cl.
- H04L 12/28 (2006.01)
- H04L 12/56 (2006.01)
- G06F 9/46 (2006.01)
- G06F 13/00 (2006.01)

(52) U.S. Cl. .................. 370/392; 718/100; 718/106; 710/100

(58) Field of Classification Search ............ 370/392; 718/100, 106; 710/100
See application file for complete search history.

(56) References Cited

U.S. PATENT DOCUMENTS

| | | | | |
|---|---|---|---|---|
| 7,181,742 | B2* | 2/2007 | Hooper | 718/100 |
| 2004/0199808 | A1* | 10/2004 | Freimuth et al. | 714/4 |
| 2005/0027793 | A1* | 2/2005 | Hass | 709/200 |
| 2005/0122986 | A1* | 6/2005 | Starr et al. | 370/412 |

* cited by examiner

Primary Examiner—Kevin C Harper
(74) Attorney, Agent, or Firm—Blakely, Sokoloff, Taylor & Zafman LLP (57) ABSTRACT

Methods and apparatus for processing transmission control protocol (TCP) packets using hardware-based multi-threading techniques. Inbound and outbound TCP packet are processed using a multi-threaded TCP offload engine (TOE). The TOE includes an execution core comprising a processing engine, a scheduler, an on-chip cache, a host memory interface, a host interface, and a network interface controller (NIC) interface. In one embodiment, the TOE is embodied as a memory controller hub (MCH) component of a platform chipset. The TOE may further include an integrated direct memory access (DMA) controller, or the DMA controller may be embodied as separate circuitry on the MCH. In one embodiment, inbound packets are queued in an input buffer, the headers are provided to the scheduler, and the scheduler arbitrates thread execution on the processing engine. Concurrently, DMA payload data transfers are queued and asynchronously performed in a manner that hides memory latencies. In one embodiment, the technique can process typical-size TCP packets at 10 Gbps or greater line speeds.

19 Claims, 8 Drawing Sheets

General purpose

| |
|---|
| LOAD A ← data |
| MOV A → B |
| AND A B → cond |
| OR A B → cond |
| ADD A B → C |
| SUB A B → C |
| CMP A B → cond |
| EQUAL A B → cond |
| NOT A → C |
| BREQZ / BRNEQZ label |
| JMP label |
| SHL2 A |
| NOP |

700

Special purpose

| Category | Instructions |
|---|---|
| Context access | TCBRD, TCBWR |
| Hashing | HSHLKP, HSHUPDT |
| Multi-threading | THRDSV, THRDRST |
| DMA commands | DMATX, DMARX |
| Timers | TIMERRD, TIMERRW |
| Network to host byte order | HTONS, HTONL, NTOHL, NTOHS |

HARDWARE-BASED MULTI-THREADING FOR PACKET PROCESSING

FIELD OF THE INVENTION

The field of invention relates generally to TCP packet processing and, more specifically but not exclusively relates to techniques for processing TCP packets using hardware-based multi-threading.

BACKGROUND INFORMATION

Transmission Control Protocol (TCP) is a connection-oriented reliable protocol accounting for over 80% of today's network traffic. TCP exists within the Transport layer, between the Application layer and the Internet Protocol (IP) layer, providing a reliable and guaranteed delivery mechanism to a destination machine. Connection-oriented protocols guarantee the delivery of packets by tracking the transmission and receipt of individual packets during communication. A session is able to track the progress of individual packets by monitoring when a packet is sent, in what order it was sent, and by notifying the sender when it is received so it can send more. To support this functionality, a significant level of processing must be performed at both the sending and destination machines.

Today, TCP processing is performed almost exclusively through software. Even with the advent of GHz (gigahertz) processor speeds, there is a need for dedicated processing in order to support high bandwidths of 10 gigabits per second (Gbps) and beyond. Several studies have shown that even state-of-the-art servers are forced to completely dedicate their CPUs (central processing unit) to TCP processing when bandwidths exceed 1 Gbps. At 10 Gbps, there are 14.8 million minimum-size Ethernet packets arriving every second, with a new packet arriving every 67.2 nanoseconds (ns). Allowing a few nanoseconds for overhead, wire-speed TCP processing requires several hundred instructions to be executed approximately every 50 ns. Given that a majority of TCP traffic is composed of small packets, this is an overwhelming burden on a server's CPU.

A generally accepted rule of thumb for network processing is that 1 GHz CPU processing frequency is required for a 1 Gbps Ethernet link. For smaller packet sizes on saturated links, this requirement is often much higher. Ethernet bandwidth is slated to increase at a much faster rate than the processing power of leading edge microprocessors. Clearly, general-purpose processors will not be able to provide the required computing power in coming generations.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 is a flowchart illustrating operations and logic performed in accordance with the packet processing pipeline diagram of FIG. 4a;

DETAILED DESCRIPTION

Embodiments of methods, apparatus and systems for processing TCP packets via multi-threaded hardware techniques are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments described herein, a novel packet processing architecture and associated techniques for TCP termination (i.e., input and output processing) for multi-gigabit Ethernet traffic are disclosed. The architecture includes a dedicated TCP offload engine (TOE) that implements a multiple thread mechanism entirely in hardware, including thread suspension, scheduling, and save/restore of thread state.

In order to better understand and appreciate advantages of the TOE architecture, a brief discussion of the limitations and problems associated with the conventional software-based TCP termination scheme is first discussed.

There are several operations in TCP termination that require improvement if future increases in bandwidth are to be handled efficiently. A first consideration concerns minimizing intermediate copies of data during both transmits and receives, which represents a significant performance bottleneck under the conventional software architecture. For examples, FIGS. 1a and 1b respectively show software transmit and receive paths corresponding to conventional packet processing. During each set of packet processing, multiple copies of the same data are copied between buffers, creating redundant operations.

Figure 1A:
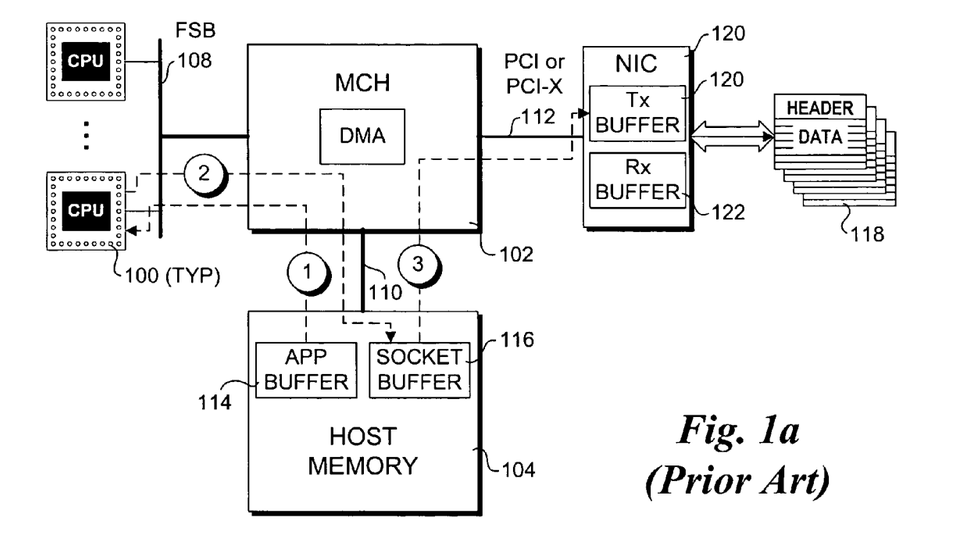
FIG. 1a is a schematic diagram illustrating data buffering and copying associated with conventional processing of an outbound TCP packet.
Figure 1B:
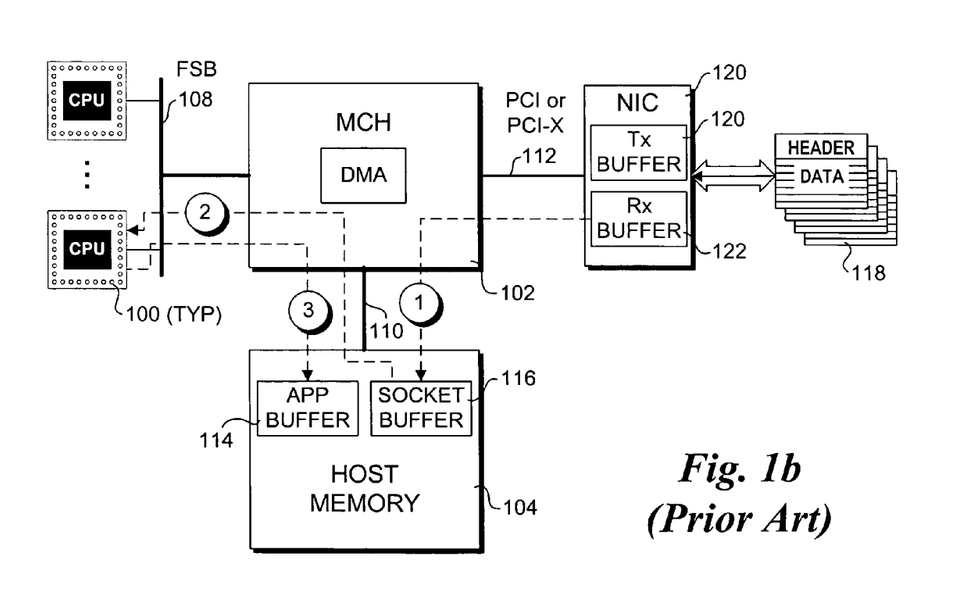
FIG. 1b is a schematic diagram illustrating data buffering and copying associated with conventional processing of an inbound TCP packet

Each of FIGS. 1a and 1b show a conventional system architecture including one or more processors 100, a memory controller hub (MCH) 102, host memory 104, and a network interface controller (NIC) 106. The processors 100 are communicatively coupled to MCH 102 via a front-side bus (FSB) 108. The host memory 104 is communicatively coupled to MCH 102 via a memory bus 110. The NIC 106 is communicatively coupled to MCH 102 via a peripheral bus, such as a peripheral component interconnect (PCI) bus 112 or a PCI Express (PCI-X) bus.

Under the conventional software transmit path of FIG. 1a, the process is initiated by an application hosted by an operating system (OS) running on a processor 100. The OS maintains an application buffer 114 for the application in host memory 104; this buffer is typically associated with an OS user space, which occupies a separate portion of memory from an OS kernel. The data to be transmitted out via NIC 106 is initially stored in application buffer 114.

Under a first operation (depicted by an encircled "1"), a processor read operation is performed, wherein the data to be transferred are read from application buffer 114. The data are then copied (i.e., written) to a socket buffer 116 in host memory 104 during a second operation. The socket buffer 116 corresponds to a network protocol component (e.g., a TCP/IP driver) running in the OS kernel. The network protocol component assembles the data into a plurality of packets based on the protocol to be employed for the network transfer (e.g., TCP). During a third operation, the packets 118 are then transferred to a transmit (Tx) buffer 120 hosted by NIC 106 via a DMA (direct memory access) write transfer. Subsequent, NIC 106 transfers packets 118 from transmit buffer 120 to a first hop in a network via which the destination node for the transmission may be reached.

As depicted in FIG. 1b, the conventional software receive processing operations are roughly analogous to the transmit operations, only in reverse. In this instance, the plurality of packets 118 are received at NIC 106 and stored in a receive (Rx) buffer 122. However, in this instance, the order of the packets may be mis-ordered relative to the original order of the packets when they were sent from the sending machine. Typically, the mis-ordered packets will be transferred from Rx buffer 122 to socket buffer 116 via a DMA read transfer, whereupon they will be reordered and reassembled by the OS kernel network protocol component. The assembled data are then transferred to application buffer 114 via sequential processor read and processor write operations.

The foregoing conventional scheme is highly inefficient. A more efficient mechanism for transferring data between application buffers and the NIC would be advantageous, both to improve performance and reduce traffic on the front-side bus. In one embodiment, this is achieved by pre-assigning buffers for data that is expected to be received, as described below in further detail.

Another problem concerns memory accesses and associated latency. Processing transmits and receives requires accessing context information for each connection that may be stored in host memory. Each memory access is an expensive operation, which can take up to 100 ns. The TOE architecture optimizes the TCP stack to reduce the number of memory accesses, significantly increasing performance. At the same time, the TOE architecture employs techniques to hide memory latency via multi-threading.

It also would be advantageous to provide improved access to state information. The context information for each TCP connection is of the order of several hundred bytes. Some method of caching the context for active connections is necessary. Studies have shown that caching context for a small number of connections is sufficient (burst mode operation) to see performance improvement (See, K. Kant, "TCP offload performance for front-end servers", to appear in *proc. of GLOBECOM* 2003, December 2003, San Francisco, Calif.). Increasing the cache size beyond that does not help unless it is made large enough to hold the entire allowable number of connections. Protocol processing requires frequent and repeated access to various fields of each context. A mechanism, such as fast local registers, to access these fields quickly and efficiently reduces the time spent in protocol processing. In addition to context information, these registers can also be used to store intermediate results during processing.

Current instruction execution schemes are inefficient. Reducing the number of instructions to be executed by optimizing the TCP stack would go a long way in reducing the processing time per packet. Another source of overhead that reduces host efficiency is the communication interface between the host and NIC. For instance, an interrupt driven mechanism, such as that conventionally used by PCI-based architectures, tends to overload the host and adversely impact other applications running on the host. Other network transmission-related processing, such as encryption, decryption, classification, etc., may be more-efficiently performed via hardware than conventional software-based schemes.

Architecture Details

Figure 2:
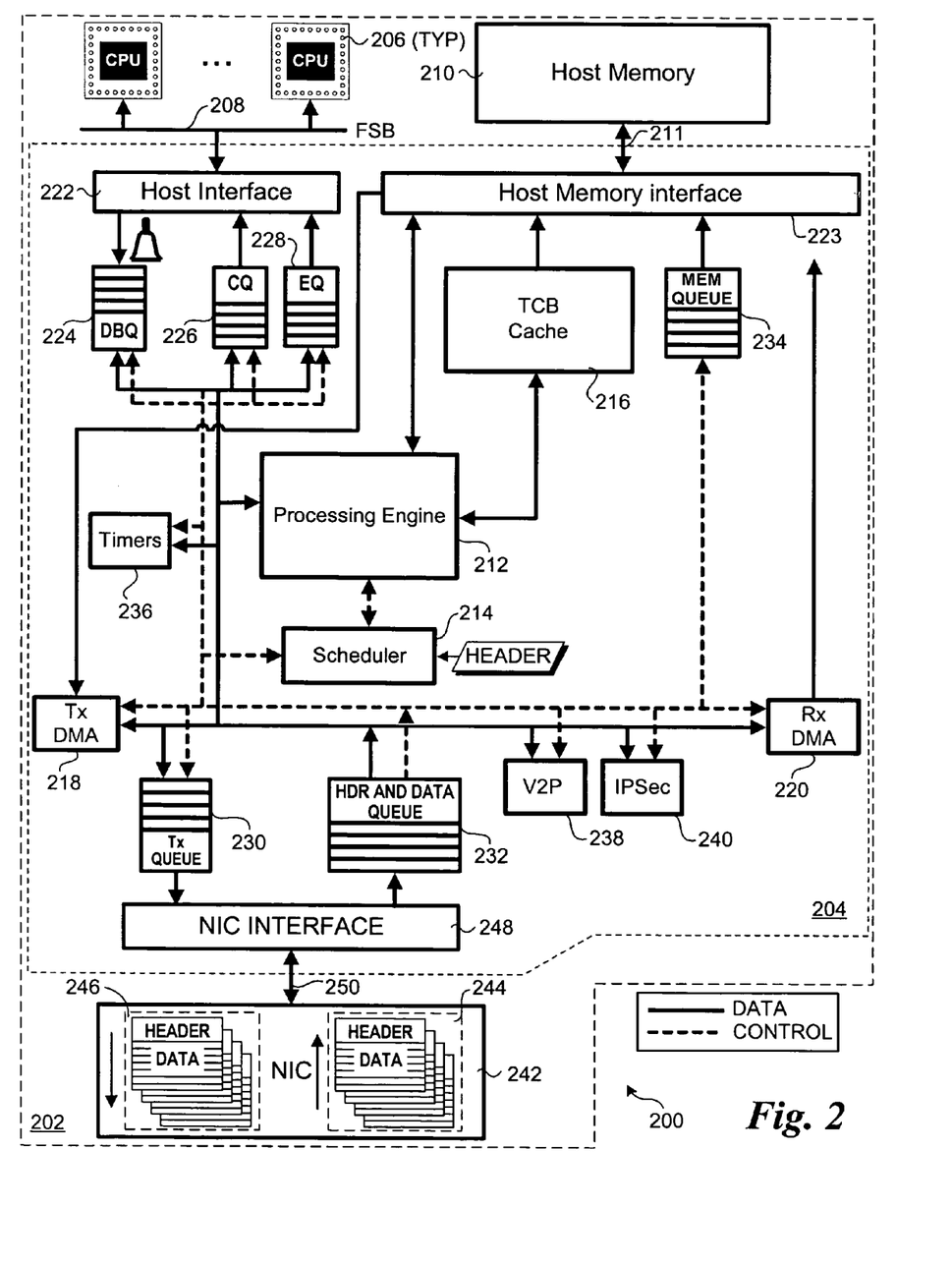
FIG. 2 is a schematic diagram illustrating an architecture of a multi-thread TCP offload engine (TOE) and associated peripheral circuitry used for performing hardware-based TCP input and output processing, according to one embodiment of the invention.

FIG. 2 shows a top-level architecture diagram 200 of a computer platform 202 including an implementation of a multi-threaded TOE, according to one embodiment. In one embodiment, as depicted, the TOE functionality is implemented via a platform chipset integrated circuit (IC) 204. As used herein the term "chipset" may include one or more physical integrated circuit chips. The exemplary computer platform also includes one or more processors 206 connected to a front-side bus 208, as well as host memory 210 connected to a memory bus 211.

In general, platform 202 will include at least one of either a network interface card or integrated network interface controller (both referred to as NICs). An exemplary NIC 242 is shown at the lower portion of platform 202. NIC 242 includes an input buffer 244 and an output buffer 246. Typically, NIC 242 will be connected to IC 204 via an expansion bus 250, such as a PCI (peripheral component interconnect) or PCI-X (PCI-Express) bus.

The TOE architectural components include an execution core (i.e., processing engine) 212, a scheduler 214, a large on-die cache (L3) (depicted as transmission control block (TCB) cache 216), and an integrated DMA controller (depicted as a transmit DMA block 218 and a receive DMA block 220). Optionally, the DMA controller may comprise separate circuitry on the same or different IC chip. In addition, the architecture provides well-defined interfaces to NIC 242, host memory 210 and the one or more host processors 208 via a host interface 222, a host memory interface 223, and a NIC interface 248, respectively.

In one embodiment, the architecture presents three queues as a hardware mechanism to interface with the one or more host processors 206 via host interface 222. A doorbell queue (DBQ) 224 is used to initiate send (or receive) requests. A completion queue (CQ) 226 and an exception/event queue (EQ) 228 are used to communicate processed results and events back to the host processor(s). In one embodiment, the architecture also defines additional queues including a transmit queue 230, a header and data queue 232, and a memory queue 234.

A timer unit 236 provides hardware offload for frequently used timers associated with TCP processing. In one embodiment, the timer unit 236 supports four timers, while in another embodiment seven timers are supported. In one embodiment, the TOE also includes hardware assist for virtual-to-physical (V2P) address translation, as depicted by a V2P block 238. In one embodiment, the TOE may also include provisions for supporting IP security (IPSec) functions, as depicted by an IPSec block 240.

Processing engine 212 comprises a high-speed processing engine, which includes interfaces to the various peripheral units. In one embodiment, a dual-frequency design is used, with the processing engine clocked several times faster (core clock) than the peripheral units (slow clock). In one embodiment, the clock speed for processing engine 212 is 4.8 GHz, while the clock speed for peripheral units including scheduler 214 and TCB cache 216 is 1.2 GHz. This approach results in minimal input buffering needs, enabling wire-speed processing.

In one embodiment, TCB cache 216 comprises 1 MB of on-die cache to store TCP connection context data, which provides temporal locality for 2048 connections, with additional context data residing in host memory 210. The context data comprises a portion of the transmission control block (TCB) that TCP is required to maintain for each connection. Caching this context on-chip is critical for 10 Gbps performance. In addition, to avoid intermediate packet copies on receives and transmits, the integrated direct memory access (DMA) controller (i.e., transmit DMA block 218 and receive DMA block 220) enables a low-latency transfer path and supports direct placement of data in application buffers without substantial intermediate buffering. Scheduler 214 provides global control to the processing engine 212 at a packet level granularity. Scheduler 214 also operates as a "traffic cop," directing various data to appropriate destinations.

In one embodiment, the DMA controller supports four independent, concurrent channels and provides a low-latency/high throughput path to/from various memory stores and buffers. In one embodiment, the TOE constructs a list of descriptors (commands for read and write), programs the DMA controller, and initiates the DMA start operation. In response, the DMA controller transfers data from sources to destinations based on the commands defined for respective descriptors in the list. Upon completion of the commands, the DMA controller notifies the TOE, which updates completion queue 226 to notify host processor 208 of the result.

Figure 3:
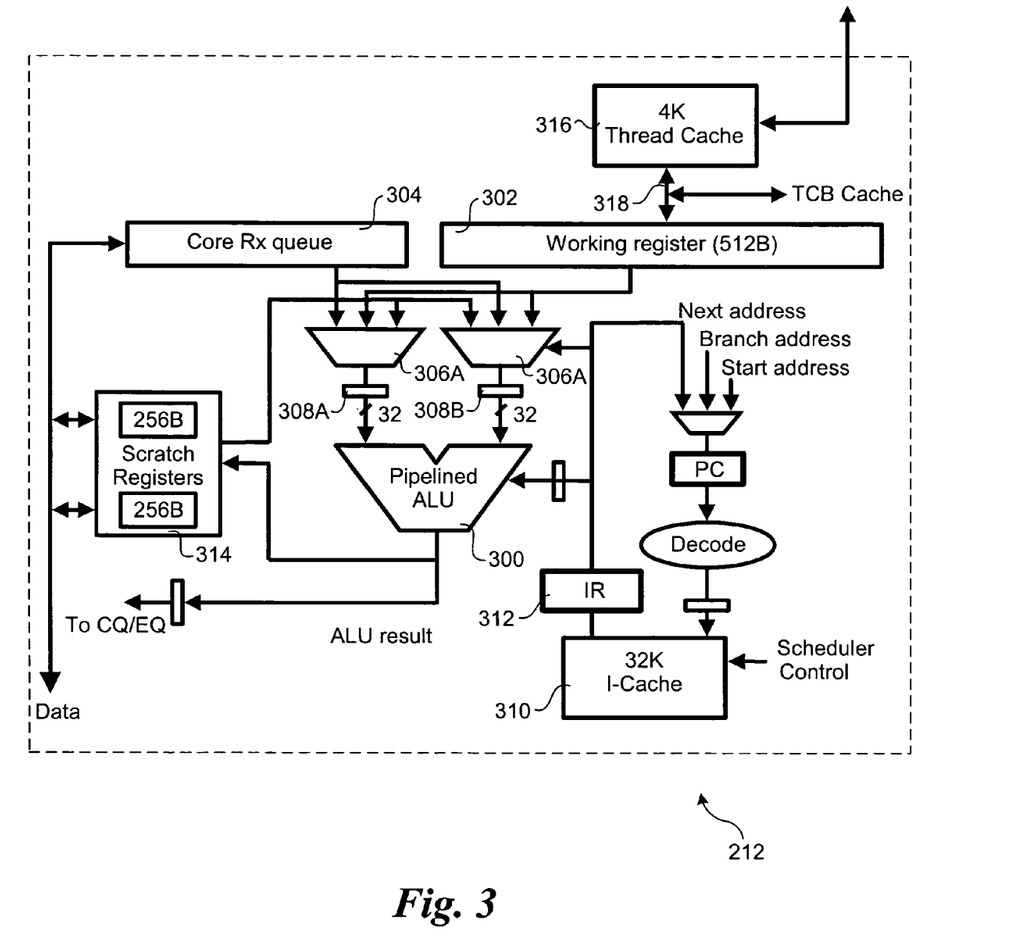
FIG. 3 is a schematic diagram showing details of the processing engine of FIG. 2, according to one embodiment of the invention.

A micro-architecture block diagram of one embodiment of processing engine 212 is detailed in FIG. 3. The micro-architecture features a high-speed fully pipelined ALU 300 at its heart, communicatively coupled to a wide working register 302 and a core receive queue 304 via multiplexers 306A and 306B and buses 308A and 308B. In one embodiment, the wide working register is 512 bytes (B) wide. In one embodiment, buses 308A and 308B are 32-bits wide. TCB context data for the current scheduled active connection is loaded into wide working register 302 for processing. The execution core (ALU 300) performs TCP processing under direction of instructions issued by an instruction cache 310. A control instruction is read every core cycle and loaded into an instruction register (IR) 312. The execution core reads instructions from IR 312, decodes them if necessary, and executes them every cycle. The functional units in the core include arithmetic and logic units, shifters and comparators—all optimized for high frequency operation. The core includes a large register set, including two 256B register arrays (i.e., scratch registers 314) to store intermediate processing results. The scheduler 214 exercises additional control over execution flow via various control inputs entered via instruction cache 310.

In an effort to hide host and TCB memory latency and improve throughput, in one embodiment the engine is multi-threaded. To support multi-threading, the design includes a thread cache 316, running at core speed, which allows intermediate architecture state to be saved and restored for each thread. In one embodiment, thread cache 316 is estimated to be 8-16 threads deep and 512 bytes wide. The width of the cache is determined by the amount of context information that needs to be saved for each packet. The depth of the cache is determined by the packet arrival rate. Analysis shows that for 256 byte packets on a 10 Gbps link for performing both receives and transmits, a 16 deep cache is sufficient because that is more than the number of packets that could be active (i.e., being processed) at any point in time.

The micro-architecture design also provides a high-bandwidth connection 318 between the thread cache and working register 302, making possible very fast and parallel transfer of thread state between the working register and thread cache 316. Thread context switches can occur during both receives and transmits and when waiting on outstanding memory requests or on pending DMA transactions. This ensures that the overhead penalty from thread switches is minimal. At the exemplary sample frequencies shown in the Figures herein, the overhead penalty is less than 3 ns. The working register 302, execution core and scratch registers 314 are completely dedicated to the packet currently being processed. This is different from other conventional approaches where the resources are split up a priori and dedicated to specific threads via software control. This ensures adequate resources for each packet without having to duplicate resources and increase engine die area.

In one embodiment, processing engine 212 features a cacheable control store, which enables only code relevant to specific TCP processing operations to be cached, with the rest of the code in host memory 210. A good replacement policy allows TCP code in the instruction cache 310 to be swapped as required. This also provides flexibility and allows for easy protocol updates. In one embodiment, TCP code is loaded into host memory 210 during system initialization operations. For example, in one embodiment the TCP code is included as part of an operating system TOE driver.

Input Processing

Figure 4A:
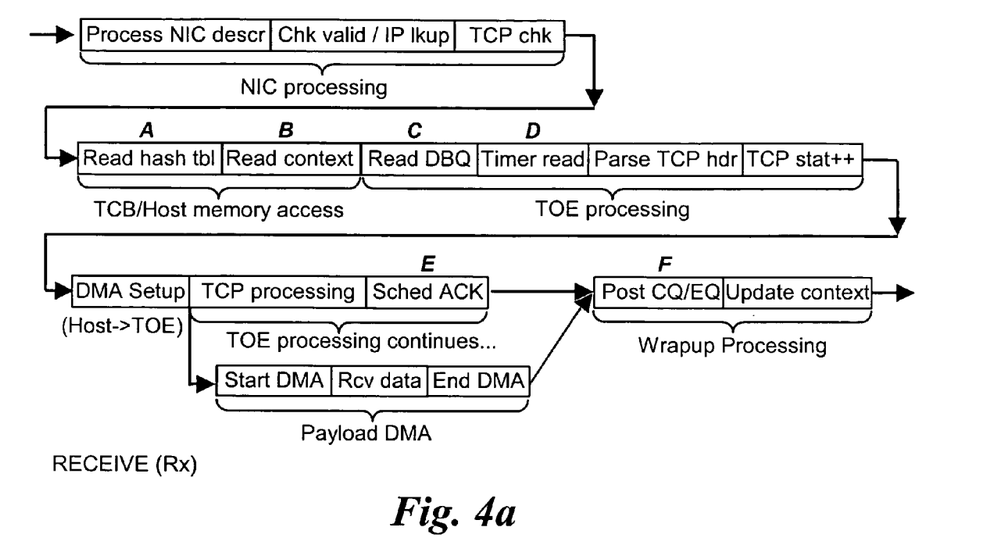
FIG. 4a is a packet processing pipeline diagram illustrating operations performed during input processing of inbound TCP packets, according to one embodiment of the invention.
Figure 5:
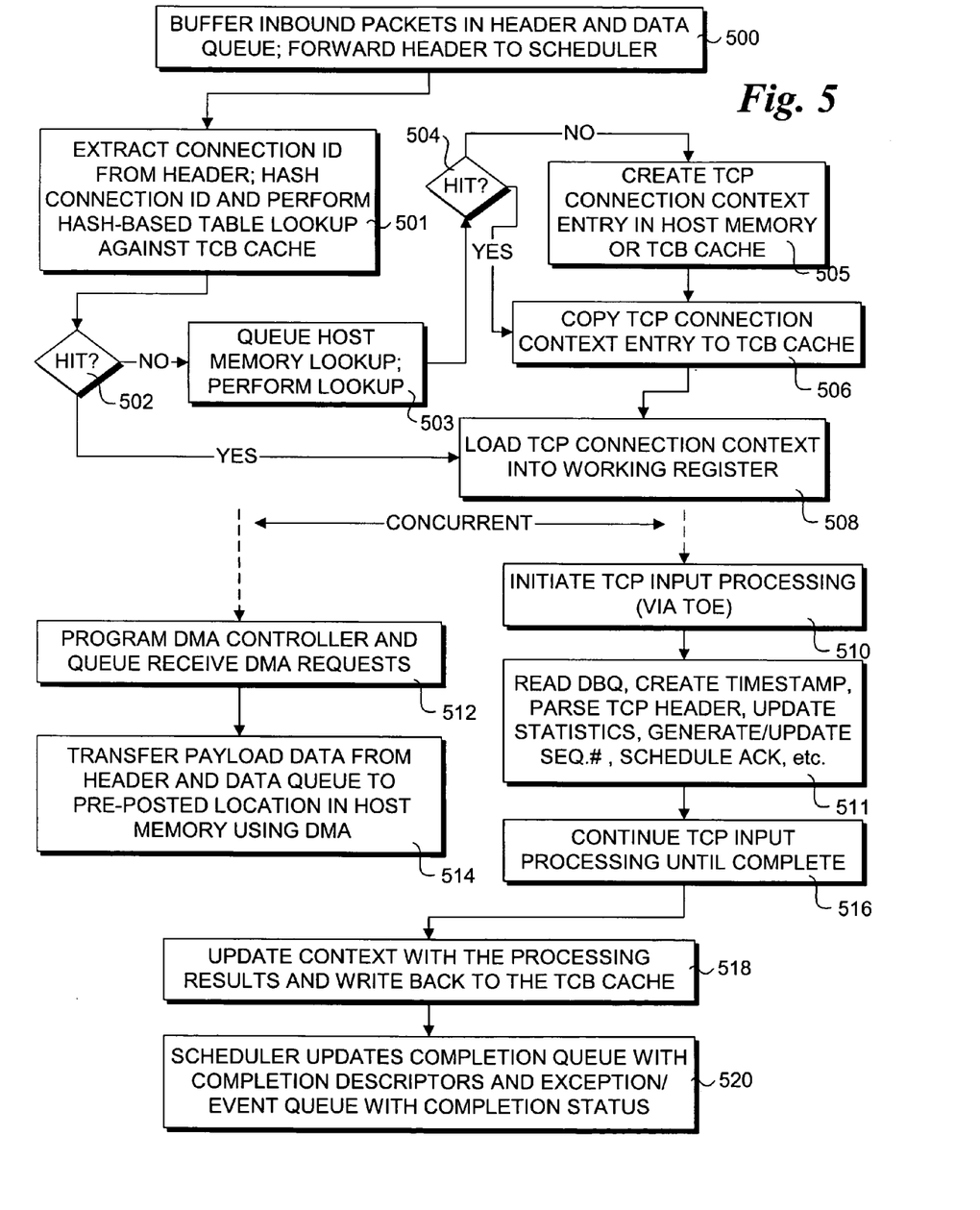

FIG. 4a shows a packet processing pipeline diagram corresponding to packet receive operations, according to one embodiment. A corresponding flowchart illustrating operations and logic performed during input processing is shown in FIG. 5. The first set of input processing operations pertain to NIC processing. In a block 500, inbound packets from NIC interface 242 are buffered in header and data queue 232, which in one embodiment functions as a queued inbound buffer. A splitter parses the packet contents to separate the header from the payload (i.e., data), forwarding the header to scheduler 214. In addition, conventional NIC processing operations are performed, including processing a NIC descriptor (containing data pertaining to the TCP connection), performing packet validation checks, and performing a TCP checksum check. If the packet is determined to be invalid via these checks, the packet is discarded.

The next set of operations pertain to TCB cache 216 and/or host memory 210 accesses. In general, these operations are used to correlate a given packet with its corresponding TCP connection. First, a check to see if TCP connection context data corresponding to the TCP connection used to deliver the packet is available in the TCB cache or host memory. If not, a new context entry is made in memory and copied to the TCB cache.

In one embodiment, TCB cache 216 is configured as a segmented cache, wherein each segment is accessed via a corresponding hash result. Generally, the number of segments in the TCB cache will depend on the granularity of the hash algorithm employed. Accordingly, in a block 501 connection identification (ID) data is extracted from the NIC descriptor. In one embodiment, the connection ID data comprise the addresses of the sender and destination corresponding to the TCP connection used to deliver the packet. A hash is then performed on the connection ID data using a pre-defined hashing algorithm.

The result of the hash will produce a hashed segment index into TCB cache 216. Thus, using this result, a hash-based lookup is performed against TCB cache 216. If the hashed segment index exists in the TCB cache (indicating corresponding TCP connection context data are present in the TCB cache), a cache hit will result. If not, a cache miss results. The result of a cache hit or miss at this point is depicted by a decision block 502 in FIG. 5.

On a cache hit, the TCP connection context data (corresponding to the currently-processed packet) is loaded into working register 302, as depicted by a block 508. On a miss, a lookup against hashed entries in host memory 210 is scheduled via memory queue 234, and then is performed (generally asynchronously), as depicted by a block 503. As illustrated by a decision block 504, if a hit results (indicating the TCP connection context data are present in host memory), the corresponding data are copied to TCB cache 216 (both TCP connection context data and hash index) in a block 506, and then the context data are loaded into working register 302 in block 508. If a miss results, the TCP connection context data have not been generated for the connection. Accordingly, a context entry (hash index and context data) is created in host memory 210, as depicted by a block 505, and immediately copied to TCB cache 216 in block 506. The logic then proceeds to block 508 to load the context into the working register.

In a block 510 TCP processing corresponding to the packet is initiated via the TOE. TCP processing includes operations generally associated with performing TCP processing-related activities, including reading doorbell queue 224, creating a timestamp for the packet (for acknowledgement/statistics purposes), parsing the TCP header, updating TCP statistics, generating or updating packet sequence numbers, scheduling ACK (acknowledgement) messages, etc. These operations are depicted by a block 511.

Substantially in parallel, the execution core also programs the DMA controller (i.e., DMA receive block 220) and queues DMA receive requests in a block 512. Payload data is then transferred from header and data queue 232 to pre-posted locations in host memory 210 using DMA transfer operations in a block 514. This concurrent, low-latency DMA transfer yields enhanced performance, while hiding memory latencies associated with conventional TCP processing techniques.

In the meantime, TCP input processing continues until it is completed, as depicted by a block 516. Subsequent to TCP processing completion, the logic proceeds to a block 518, wherein the TCP connection context is updated with the processing results and written back to the TCB cache 216. In a block 520, the scheduler 214 then updates completion queue 226 with completion descriptors and exception/event queue 228 with completion status data (e.g., pass/fail), which can generate a host processor interrupt, thus informing the processor that processing for a packet has been completed. In general, events can either be exception status events or interrupts. In one embodiment, an operating system-level or firmware driver may be employed to coalesce the events and interrupts for more efficient processing.

Output Processing

Figure 4B:
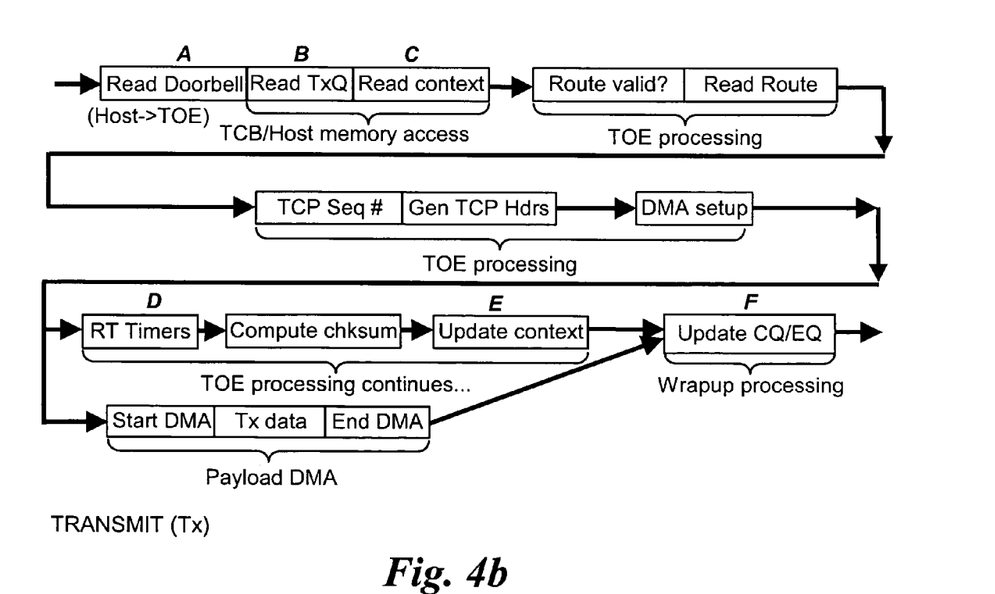
FIG. 4b is a packet processing pipeline diagram illustrating operations performed during output processing of outbound TCP packets, according to one embodiment of the invention.
Figure 6:
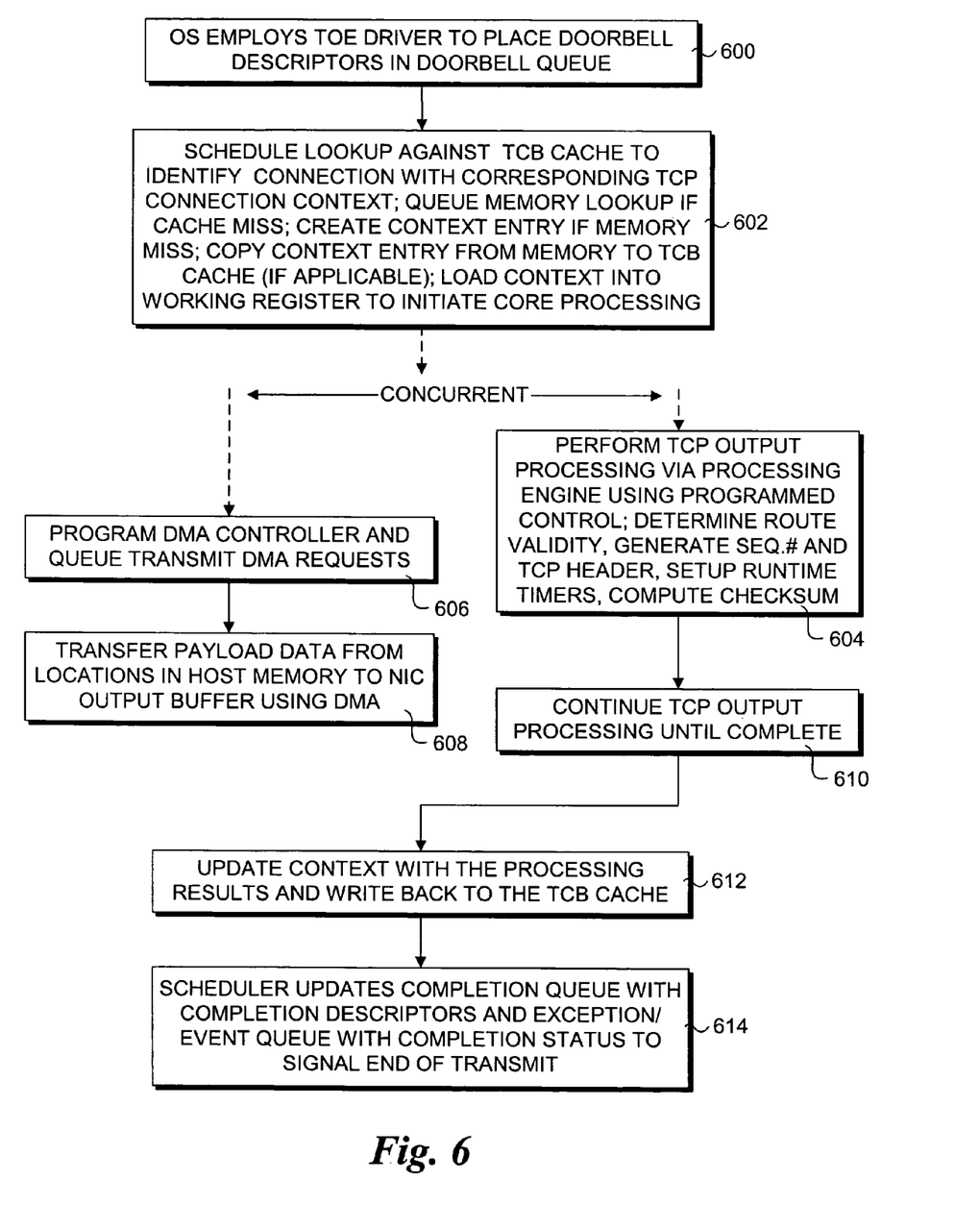
FIG. 6 is a flowchart illustrating operations and logic performed in accordance with the packet processing pipeline diagram of FIG. 4b.

FIG. 4b shows a packet processing pipeline diagram corresponding to packet transmit operations, according to one embodiment, while corresponding operations and logic are illustrated in the flowchart of FIG. 6. During corollary operations (i.e., operations that are not performed by the TOE), the OS employs a TOE driver (implemented as a software-based OS driver or a firmware-based driver) to place doorbell descriptors in doorbell queue 224, as shown in a block 600. The doorbell queue contains pointers to either the Tx or Rx descriptors queues (depending on whether the doorbell queue entry corresponds to a send or receive operations), which reside in host memory 214. The TOE is responsible for fetching and caching the descriptors in TCB cache 216.

Next, the connection (corresponding to a given transmit session) is identified by scheduling a lookup against TCB cache 216 in a block 602. In a manner similar to that discussed above, first a lookup is made against the TCB cache. If a hit results, the TCP connection context data is loaded into working register 302 to initiate core TCP processing for the current outbound packet. If a cache miss results, a memory lookup is queued and performed in a manner analogous with block 503. If a memory hit results, the context entry is copied to the TCB cache and loaded into the working register. If a memory miss results, a TCP context entry is created in host memory, copied to the TCB cache, and then loaded into the working register.

In accordance with a block 604, processing engine 212 then performs the heart of TCP output processing under programmed control at high speed. In one embodiment, these operations include determining route validity, generating TCP sequence numbers, generating TCP headers, setting up runtime timers (by interacting with the timer block to set and clear timers 236), and computing checksums. In parallel with the TCP output processing operations, the core also programs the DMA control unit (i.e., DMA transmit block 218) by building an appropriate descriptor ring and queues the transmit DMA requests in transmit queue 230, as depicted by a block 606. Here again, for low latency, payload data is transferred from the payload locations in host memory to NIC outbound buffer 246 using DMA transfers, as depicted by a block 608.

Meanwhile, TCP output processing continues until it is completed, as depicted by a block 610. Subsequent to TCP output processing completion, the logic proceeds to a block 612, wherein the context is updated with the processing results and written back to the TCB cache 216. In a block 612, the scheduler 214 then updates completion queue 226 with completion descriptors and exception/event queue 228 with completion status data to signal end of transmit.

Figure 7:
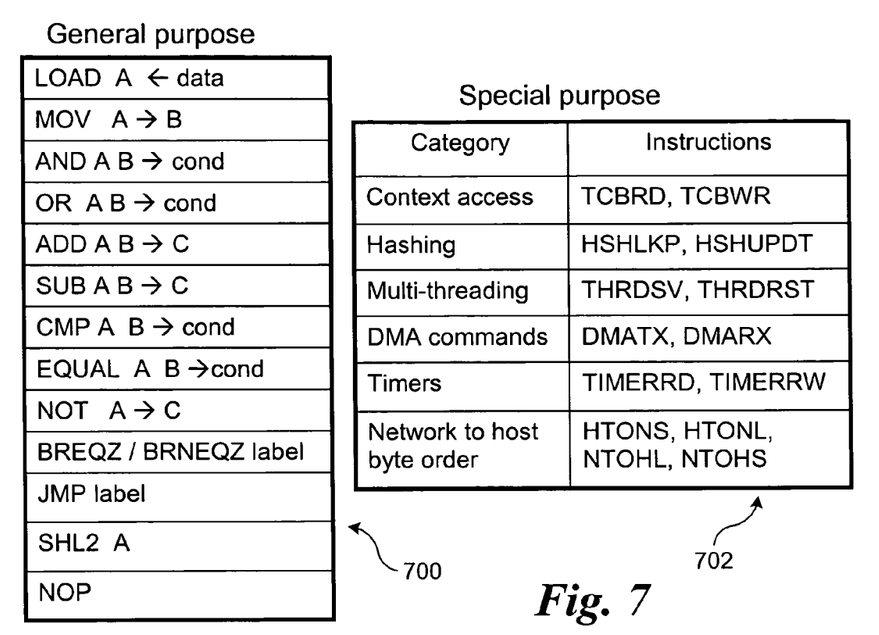
FIG. 7 illustrates a set of general purpose instruction and special purpose instructions that may be implemented by an exemplary multi-threaded TOE, according to one embodiment of the invention.

FIG. 7 shows sets of general purpose instructions 700 and special purpose instructions 702 employed by one embodiment of the TOE. The general purpose instructions are roughly analogous to basic instructions used by general purpose processors, such as loading moving, simple mathematical operations, jumps, NOPs, etc.). In one embodiment, the general purpose instructions 700 operate on 32 bit operands.

The specialized instruction set was developed for efficient TCP processing. It includes special purpose instructions for accelerated context lookup, loading and write back. In one embodiment, these instructions enable context loads and stores from TCB cache 216 in eight slow cycles, as well as 512B wide context read and write between the core and thread cache 316 in a single core cycle. The special purpose instructions include single cycle hashing, DMA transmit and receive instructions and timer commands. Hardware assist for conversion between host and network byte order is also available.

TCP-Aware Hardware Multi-Threading and Scheduling Logic

The multi-threaded architecture enables hiding of latency from memory accesses and other hardware functions and thus expedites inbound and outbound packet processing, minimizing the need for costly buffering and queuing. Hardware-assisted multi-threading enables storage of thread state in private (i.e., local host) memory. True hardware multi-threading takes this further by implementing the multiple thread mechanism entirely in hardware. In one embodiment, scheduler 214 is a TCP-aware scheduler that is configured to handle the tasks of thread suspension, scheduling, synchronizing and save/restore of thread state and the conditions that trigger them. TCP stack analysis shows that there are a finite number of such conditions, which can be safely moved to hardware. The motivation is to free the programmer from the responsibility of maintaining and scheduling threads and to mitigate human error. This model is thus simpler than the more common conventional model of a programmer or compiler generated multi-threaded software code. In addition, the same code that runs on a single-threaded engine can run unmodified on processing engine 212 with greater efficiency. Under the hardware-based thread control architecture, the overhead penalty from switching between threads is kept minimal to achieve better throughput. In one embodiment, the architecture also provides instructions to support legacy manual multi-threaded programming.

Hardware multi-threading is best illustrated with an example. TCP packet processing requires several memory accesses as well as synchronization points with the DMA engine that can cause the execution core to stall while waiting for a response from such long-latency operations. Six such trigger conditions are identified (labeled A-F) in the pipeline diagrams in FIGS. 4a and 4b. If core TCP input or output processing completes prior to the parallel DMA operations, thread switch can occur to improve throughput. When the DMA operations end, the thread switches back to update the context with processed results and the updated context is written back to the TCB. Thread switches can happen during both transmit and receive processing. Unlike conventional software-based multi-threading, where thread switch, lock/un-lock and yield points are manually controlled, the TCP-aware scheduler controls the switching and synchronization between different threads in all the above cases.

In one embodiment, a single thread is associated with each network packet that is being processed, both incoming and outgoing. This differs from other conventional approaches that associate threads with each task to be performed, irrespective of the packet. The scheduler 214 spawns a thread when a packet belonging to a new connection needs to be processed. A second packet for that same connection will not be assigned a thread until the first packet is completely processed and the updated context has been written back to TCB cache 216. This is under the control of scheduler 214. When the processing of a packet in the core is stalled, the thread state is saved in thread cache 316 and scheduler 214 will spawn a thread for a packet on a different connection. It may also wake up a thread for a previously suspended packet by restoring its state and allow it to run to completion. In one embodiment under this approach, scheduler 214 also spawns special maintenance threads for global tasks, such as gathering statistics on Ethernet traffic.

Figure 8:
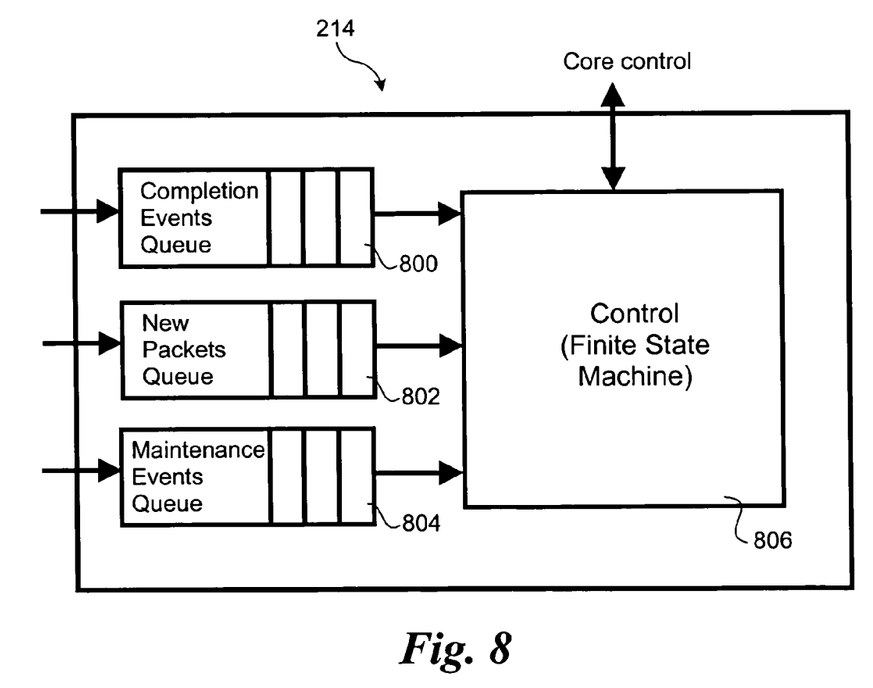
FIG. 8 is a block schematic diagram of the scheduler of FIG. 2, according to one embodiment of the invention.

In one embodiment, scheduler 214 implements a priority mechanism to determine which packet to schedule next for core processing. Details of a block architecture for one embodiment of scheduler 214 that supports the priority mechanism is shown in FIG. 8. The scheduler includes a completion events queue 800, a new packets queue 802, and a maintenance events queue 804. Each of these queues is processed by a control block 806. In one embodiment, the control block comprises a finite state machine. The control block 806 interfaces with processing engine 212 to provide core control.

In one embodiment, the priority mechanism is programmed into scheduler 214. In one embodiment, scheduler 214 arbitrates between events that wake up or spawn threads from the following categories:

1. New packets on fresh connections, or on existing connections with no active packets in the engine.
2. New packets on existing network connections with active packets in the engine.
3. Completion events for suspended threads.
4. Maintenance and other global events.

Efficient multi-threading is critical to the ability of the offload engine to scale up to multi-gigabit Ethernet rates. The design and validation of the TOE is simpler in this approach than conventional approaches to multi-threading. It also simplifies requirements on the compiler and the programming model.

As discussed above, embodiments of the invention may be implemented via an integrated circuit (i.e., semiconductor chip). In one embodiment, the TOE circuitry and DMA circuitry are implemented on a common platform chipset component, such as but not limited to an MCH. In other embodiments, the foregoing TOE functionality may be implemented via appropriate circuitry integrated into a NIC or a processor.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Figure 9:
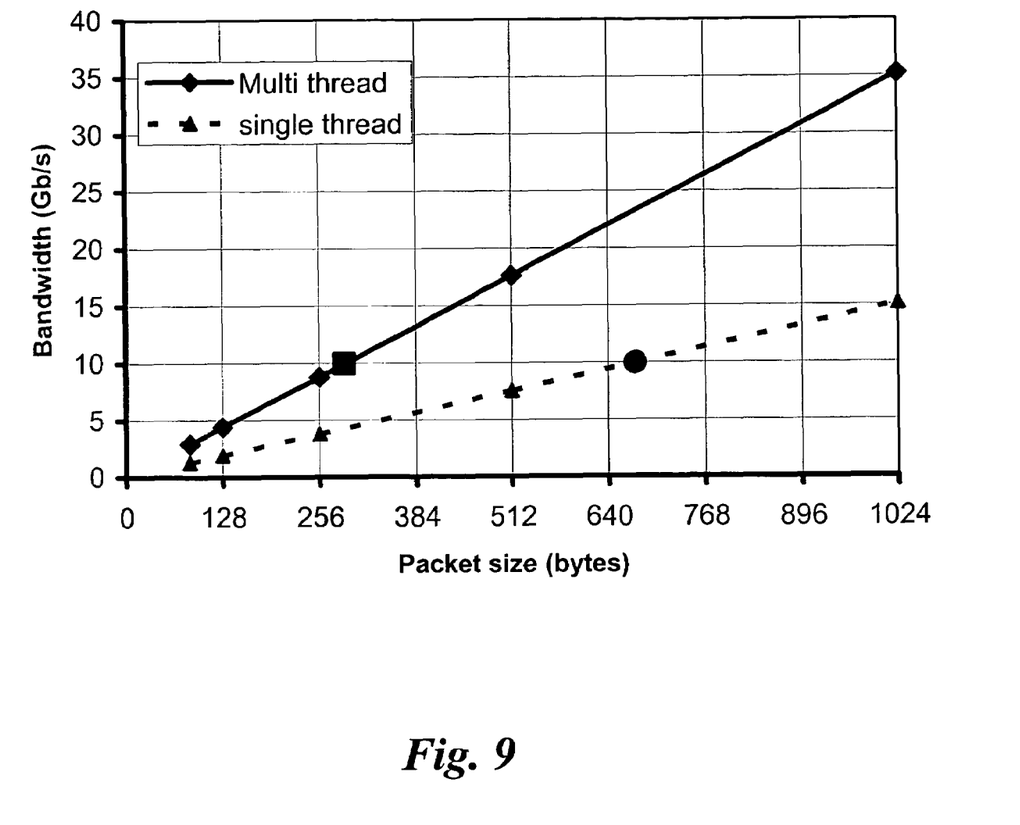
FIG. 9 is a graph comparing predicted bandwidth performance of a multi-threaded TOE and a single-threaded TOE, according to an exemplary Ethernet full duplex performance model.

The TOE described above has been architected for efficient TCP termination in the platform chipset. An analysis of the performance of such a system has been modeled to predict its capability in terms of full duplex Ethernet bandwidth for particular packet sizes. Predicted bandwidth vs. packet size performance corresponding to exemplary performance models for a single thread and multi-threaded architectures are shown in FIG. 9.

Assuming the time for processing transmits is similarly distributed, the TOE multiplexes between receiving and transmitting packets. The bandwidth it can support is inversely proportional to the size of the packets, as shown in FIG. 9. This analysis shows that the multi-threaded architecture is capable of wire-speed TCP termination at full duplex 10 Gbps rate for packets larger than 289 bytes. A single-threaded design can achieve the same performance for packet sizes larger than 676 bytes, showing greater than 2× difference in performance.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
buffering in an inbound buffer packet header and payload data corresponding to a plurality of inbound transmission control protocol (TCP) packets received at a destination machine;
performing TCP input processing of the packet header and payload data that is buffered in the inbound buffer via a multi-threaded hardware engine, wherein multiple hardware-arbitrated threads are concurrently executed by the multi-threaded hardware engine to process the plurality of inbound TCP packets;
performing a direct memory access (DMA) to concurrently transfer payload data buffered in the inbound buffer to a host memory while performing TCP input processing via the multi-threaded hardware engine;
determining an existence of a TCP connection;
generating TCP connection context data corresponding to the TCP connection;
storing the TCP connection context data in the host memory;
maintaining a cache in which selected TCP connection context data is cached;
retrieving TCP connection context data for a given packet from one of the host memory and the cache;
loading the retrieved TCP connection context data into a working register; and
processing the TCP connection context data via the multi-threaded hardware engine to perform TCP input processing.

2. The method of claim 1, further comprising arbitrating thread processing via a hardware-based scheduler.

3. The method of claim 2, wherein arbitrating thread processing comprises performing at least one of thread suspension, thread scheduling, thread synchronizing, saving thread state and restoring thread state.

4. The method of claim 1, wherein the multi-threaded hardware engine comprises a dedicated TCP offload engine (TOE).

5. The method of claim 1, further comprising pre-posting memory locations in the host memory to which payload data is to be transferred.

6. The method of claim 1, further comprising:
performing a hash-based lookup against the cache to determine if the TCP connection context data for the given packet is present in the cache; and
loading the TCP connection context data from the cache into the working register if the hash-based lookup results in a cache hit, otherwise copying the TCP connection context data from the host memory into the cache prior to loading the TCP connection data into the working register.

7. A method comprising:
generating transmission control protocol (TCP) connection context data corresponding to a TCP connection employed to transmit payload data stored in a host memory from a host machine to a destination machine;
performing TCP output processing of the payload data stored in memory via a multi-threaded hardware engine running on the host machine, wherein multiple hardware-arbitrated threads are concurrently executed by the engine to generate a plurality of outbound TCP packets containing the payload data, each outbound TCP packet including a header containing TCP connection data corresponding to the TCP connection context data;
performing a direct memory access (DMA) transfer to concurrently transfer data comprising outbound TCP packets from host memory to a network interface controller (NIC) while performing TCP output processing via the multi-threaded hardware engine;
maintaining a cache in which selected TCP connection context data is cached;
retrieving the TCP connection context data for a given portion of payload data from one of the host memory and the cache;
loading the TCP connection context data into a working register;
processing the TCP connection context data via the multi-threaded hardware engine to perform TCP output processing;
performing a hash-based lookup against the cache to determine if the TCP connection context data for the given portion of payload data is present in the cache; and
loading the TCP connection context data from the cache into the working register if the hash-based lookup results in a cache hit, otherwise copying the TCP connection context data from host memory into the cache prior to loading the TCP connection data into the working register.

8. The method of claim 7, further comprising arbitrating thread processing via a hardware-based scheduler.

9. The method of claim 8, wherein arbitrating thread processing comprises performing at least one of thread suspension, thread scheduling, thread synchronizing, saving thread state and restoring thread state.

10. The method of claim 7, wherein the multi-threaded hardware engine comprises a dedicated TCP offload engine (TOE).

11. The method of claim 7, further comprising maintaining a DMA transmit queue containing information defining how DMA transfers are queued.

12. An integrated circuit, comprising:
a multi-threaded transmission control protocol (TCP) offload engine (TOE), including:
a processing engine having:
a pipelined arithmetic logic unit (ALU);
a working register, communicatively coupled to the pipelined ALU;

an instruction cache to store instructions executable by the pipelined ALU; and an instruction register, communicatively coupled between the instruction cache and the pipelined ALU;

a scheduler, communicatively coupled to the processing engine;

a host memory interface, communicatively coupled to the processing engine; and a network interface controller (NIC) interface; communicatively coupled to the processing engine; and a direct memory access (DMA) controller, communicatively coupled to the NIC interface and the host memory interface.

13. The integrated circuit of claim 12, further comprising a cache communicatively coupled to the processing engine and the host memory interface.

14. The integrated circuit of claim 12, further comprising a host interface communicatively coupled to the processing engine.

15. The integrated circuit of claim 12, wherein the processing engine further includes a thread cache, communicatively coupled to the working register.

16. The integrated circuit of claim 12, wherein the integrated circuit comprises a memory controller hub (MCH) in a platform chipset.

17. A system, comprising:

at least one processor, communicatively coupled to a frontside bus;

host memory communicatively coupled to a memory bus; and a memory controller hub (MCH) communicatively coupled to the at least one processor via the frontside bus and the host memory via the memory bus, the MCH embodied as an integrated circuit comprising:

a multi-threaded transmission control protocol (TCP) offload engine (TOE), including:

a processing engine;

a scheduler, communicatively coupled to the processing engine;

a host memory interface, communicatively coupled to the processing engine and the memory bus;

a host interface, communicatively coupled to the processing engine and the frontside bus;

a network interface controller (NIC) interface; communicatively coupled to the processing engine; and a direct memory access (DMA) controller, communicatively coupled to the NIC interface and the host memory interface.

18. The system of claim 17, further comprising a network interface controller (NIC), communicatively coupled to the NIC interface via one of a PCI (peripheral component interconnect) or PCI-X (PCI Express) bus.

19. The system of claim 17, wherein the MCH further includes a cache communicatively coupled to the processing engine and the host memory interface.

* * * * *

UNITED STATES PATENT AND TRADEMARK OFFICE
CERTIFICATE OF CORRECTION

PATENT NO.       : 7,668,165 B2                                                       Page 1 of 1
APPLICATION NO. : 10/814496
DATED            : February 23, 2010
INVENTOR(S)      : Hoskote et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1729 days.

Signed and Sealed this

Twenty-eighth Day of December, 2010

David J. Kappos
*Director of the United States Patent and Trademark Office*